US012403898B2

(12) United States Patent
McGrory et al.

(10) Patent No.: US 12,403,898 B2
(45) Date of Patent: Sep. 2, 2025

(54) METHOD AND SYSTEM FOR FRICTION-AWARE IMPACT AVOIDANCE

(71) Applicant: GM Global Technology Operations LLC, Detroit, MI (US)

(72) Inventors: Jackson Barry McGrory, Mississauga (CA); Paul Guillermo Otanez, Franklin, MI (US); Ravichandran Manogaran, Ann Arbor, MI (US); Mohammadali Shahriari, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 188 days.

(21) Appl. No.: 18/475,621

(22) Filed: Sep. 27, 2023

(65) Prior Publication Data
US 2025/0100547 A1 Mar. 27, 2025

(51) Int. Cl.
*B60W 30/09* (2012.01)
*B60W 10/18* (2012.01)
*B60W 10/20* (2006.01)
*B60W 30/095* (2012.01)
*B60W 40/068* (2012.01)
*B60W 50/12* (2012.01)

(52) U.S. Cl.
CPC ............ *B60W 30/09* (2013.01); *B60W 10/18* (2013.01); *B60W 10/20* (2013.01); *B60W 30/0956* (2013.01); *B60W 40/068* (2013.01); *B60W 50/12* (2013.01); *B60W 2552/40* (2020.02); *B60W 2554/80* (2020.02)

(58) Field of Classification Search
None
See application file for complete search history.

(56) References Cited

U.S. PATENT DOCUMENTS

| 8,788,176 | B1 * | 7/2014 | Yopp | B60W 30/162 |
| | | | | 701/96 |
| 11,097,739 | B2 * | 8/2021 | Capua | B60W 40/107 |
| 12,195,082 | B2 * | 1/2025 | Schumann | B62D 15/025 |
| 2007/0061061 | A1 * | 3/2007 | Salman | B60T 8/172 |
| | | | | 701/72 |
| 2008/0046145 | A1 * | 2/2008 | Weaver | B60T 7/22 |
| | | | | 701/41 |
| 2012/0022747 | A1 * | 1/2012 | Zagorski | B60T 8/172 |
| | | | | 701/80 |

(Continued)

FOREIGN PATENT DOCUMENTS

CN 112884288 A * 6/2021 ............ G06Q 50/265

OTHER PUBLICATIONS

Translation and Original for CN112884288A, Jun. 1, 2021.*

*Primary Examiner* — Rachid Bendidi
*Assistant Examiner* — Nada Mahyoob Alqaderi
(74) *Attorney, Agent, or Firm* — Vivacqua Crane, PLLC

(57) ABSTRACT

A method controlling a vehicle includes detecting that an object is along a path of the vehicle and within a predetermined distance from the vehicle, in response to detecting the object that is along the path of the vehicle and within the predetermined distance from the vehicle, determining, in real time, a coefficient of friction between a road and a tire of the vehicle, and in respond to determining the coefficient of friction between the road and the tire of the vehicle, commanding the vehicle to perform a control action.

13 Claims, 2 Drawing Sheets

(56) References Cited

U.S. PATENT DOCUMENTS

| | | | |
|---|---|---|---|
| 2013/0211687 A1* | 8/2013 | Trost | B60T 7/22 |
| | | | 701/70 |
| 2016/0167519 A1* | 6/2016 | Luke | B60L 58/12 |
| | | | 701/22 |
| 2018/0037234 A1* | 2/2018 | Hoedt | G05D 1/0891 |
| 2019/0126933 A1* | 5/2019 | Jonasson | B60W 40/072 |
| 2019/0256103 A1* | 8/2019 | Capua | B60W 40/101 |
| 2021/0383040 A1* | 12/2021 | Cho | B60T 17/22 |
| 2022/0185293 A1* | 6/2022 | Choi | B60W 10/18 |
| 2022/0212677 A1* | 7/2022 | Zheng | B60T 8/17551 |
| 2023/0211788 A1* | 7/2023 | Zhang | B60T 8/172 |
| | | | 701/80 |

* cited by examiner

METHOD AND SYSTEM FOR FRICTION-AWARE IMPACT AVOIDANCE

INTRODUCTION

The present disclosure relates to a method and system for controlling a vehicle. More specifically, the present disclosure relates to a method and system for friction-aware impact avoidance.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

The motion of a vehicle may be affected may the friction between the road and the vehicle tires. Therefore, it is useful to know the coefficient of friction between the road surface and the vehicle tires. In addition, it is desirable to consider the friction between the road and the vehicle tires when controlling the movement of the vehicle.

SUMMARY

The present disclosure describes a method for friction-aware impact avoidance. In an aspect of the present disclosure, the method includes detecting that an object is along a path of the vehicle and within a predetermined distance from the vehicle, determining, in real time, a coefficient of friction between a road and a tire of the vehicle in response to detecting the object that is along the path of the vehicle and within the predetermined distance from the vehicle, and commanding the vehicle to perform a control action in respond to determining the coefficient of friction between the road and the tire of the vehicle. Other embodiments of this aspect include corresponding computer systems, apparatus, and computer programs recorded on one or more computer storage devices, each configured to perform the actions of the methods. The method described in this paragraph improves vehicle technology by using the coefficient of friction between the road and the tires of the vehicles to avoid impacting objects.

Implementations may include one or more of the following features. The method may include applying a braking load to a wheel of the vehicle, monitoring a movement of the vehicle (e.g., longitudinal deceleration, wheel speed and/or GNSS speed) at the same time as the braking load is applied to the wheel of the vehicle, and determining, in real time, the coefficient of friction between the road and the tire of the vehicle based on the movement of the vehicle while the braking load. The control action may be continuously applying the braking load to the wheel of the vehicle in response to determining that the coefficient of friction between the road and the tire of the vehicle is less than the predetermined friction threshold. Alternatively, or additionally, the control action may be steering the vehicle to avoid the object along the path of the vehicle in response to determining that the coefficient of friction between the road and the tire of the vehicle is equal to or greater than the predetermined friction threshold. The steering path has a radius of curvature. The method may include a radius of curvature of the steering path. The radius of curvature of the steering path may be based on the coefficient of friction between the tire and the road. The method may include determining a time to impact with the object that is along the path of the vehicle and within the predetermined distance from the vehicle, determining a last time to determine friction; determining a last time to steer the vehicle to avoid the object along the path of the vehicle, determining a sum of the last time to determine friction and the last time to steer the vehicle to avoid the object along the path of the vehicle, and comparing the time to impact with the object that is along the path of the vehicle with the sum of the last time to determine friction and the last time to steer the vehicle to avoid the object along the path of the vehicle to determine whether the time to impact with the object that is along the path of the vehicle is greater than the sum of the last time to determine friction and the last time to steer the vehicle to avoid the object along the path of the vehicle. The method may include determining the last time to brake to avoid the object along the path of the vehicle in response to determining that the time to impact with the object that is along the path of the vehicle is greater than the sum of the last time to determine friction and the last time to steer the vehicle to avoid the object along the path of the vehicle. The method may include determining a sum of the last time to brake to avoid the object along the path of the vehicle and the time to determine friction in response to determining that the time to impact with the object that is along the path of the vehicle is greater than the sum of the last time to determine friction and the last time to steer the vehicle to avoid the object along the path of the vehicle. Further, the method may include comparing the time to impact with the object that is along the path of the vehicle with the sum of the last time to brake to avoid the object along the path of the vehicle and the time to determine friction to determine whether the time to impact is less than the sum of the last time to brake to avoid the object along the path of the vehicle and the time to determine friction in response to determining that the time to impact with the object that is along the path of the vehicle is greater than the sum of the last time to determine friction and the last time to steer the vehicle to avoid the object along the path of the vehicle. The coefficient of friction between the road and the tire of the vehicle may be determined solely in response to: (a) detecting the object that is along the path of the vehicle and within the predetermined distance from the vehicle; and (b) determining that the time to impact is less than the sum of the last time to brake to avoid the object along the path of the vehicle and the time to determine friction. The method may include determining an updated last time to steer to avoid the object that is along the path of the vehicle based on the coefficient of friction between the road and the tire of the vehicle in response to determining that the coefficient of friction between the road and the tire of the vehicle is equal to or greater than the predetermined friction threshold and comparing the time to impact with the object along the path of the vehicle with the updated last time to steer to avoid the object that is along the path of the vehicle to determine whether the time to impact with the object along the path of the vehicle is greater than the updated last time to steer to avoid the object that is along the path of the vehicle. The vehicle may be commanded to perform the control action solely in response to determining that the time to impact with the object along the path of the vehicle is greater than the updated last time to steer to avoid the object that is along the path of the vehicle. The control action may be steering the vehicle to avoid the object along the path of the vehicle in response to determining that the coefficient of friction between the road and the tire of the vehicle is equal to or greater than the predetermined friction threshold. The control action may include commanding a display of the vehicle to show an alert, such as "keep braking" and/or "do not steer"). The display 29, for example, may issue an alert to the driver (e.g., "keep braking" and/or "do not steer").

Inadequate road friction may be used as a condition to inhibit prompts or "nudges" to suggest that the driver attempt to steer evasive (e.g., alarms, vibrations, screen messages, HUD alerts, etc.). Inadequate road friction may be used as a condition to inhibit evasive steering assist that engages after the driver begins to steer. Implementations of the described techniques may include hardware, a method or process, or computer software on a computer-accessible medium.

The present disclosure also describes a system including sensors and a controller in communication with the sensors. The controller is programmed to execute the method described above. The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
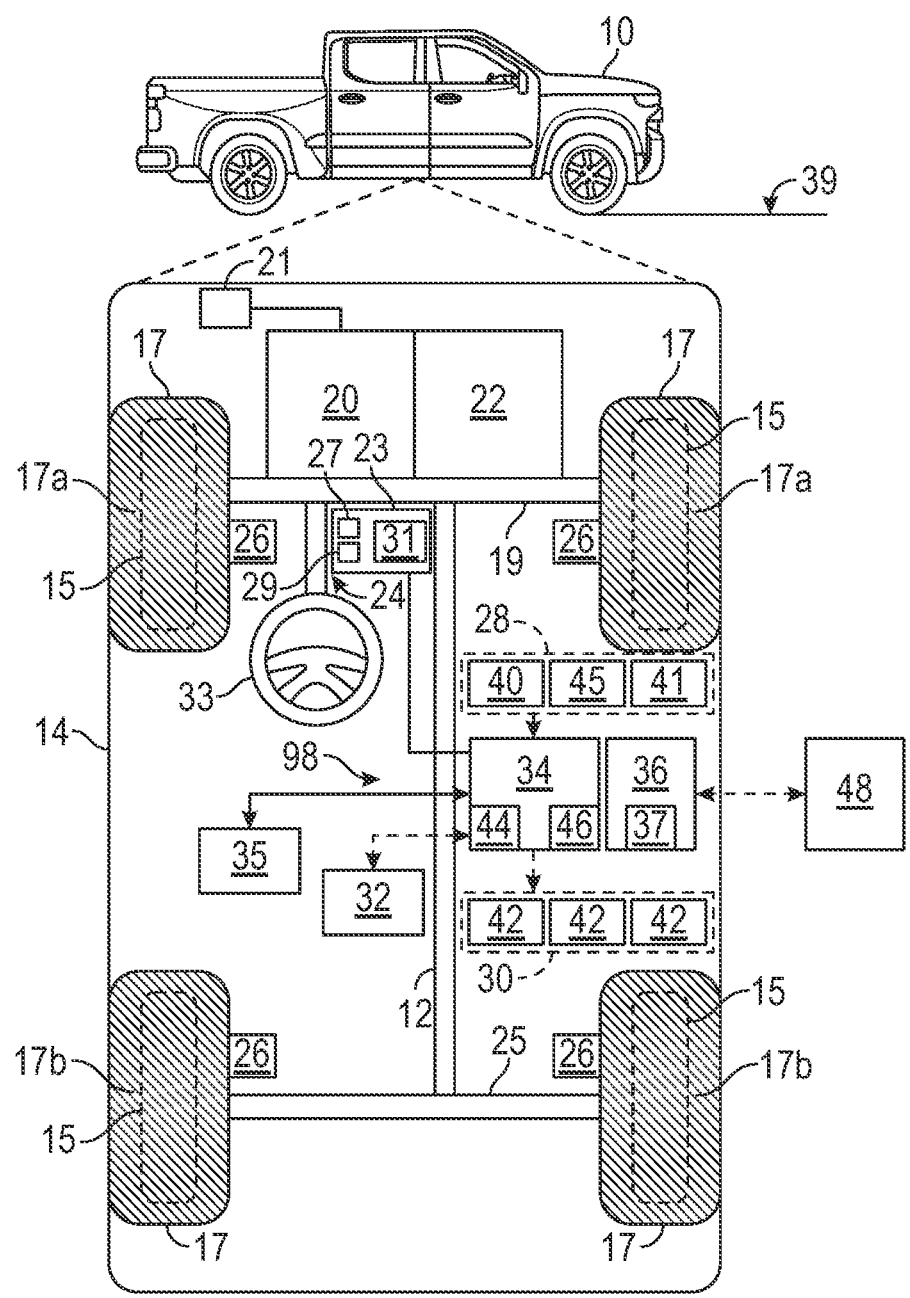
FIG. 1 is a block diagram of a vehicle.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 is configured to be driven on a road 39 and generally includes a chassis 12, a body 14, wheels 15, front and rear tires 17 and may be referred to as a vehicle system. In the depicted embodiment, the vehicle 10 includes two front tires 17a and two rear tires 17b. The body 14 is arranged on the chassis 12 and substantially encloses components of the vehicle 10. The body 14 and the chassis 12 may jointly form a frame. The wheels 15 are each rotationally coupled to the chassis 12 near a respective corner of the body 14. Each tire 17 is coupled to one of the wheels 15. The vehicle 10 includes a front axle 19 coupled to the front tires 17a and a rear axle 25 coupled to the rear tires 17b.

The vehicle 10 may be an autonomous vehicle, and a control system 98 is incorporated into the vehicle 10. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may include a so-called a Level Two, a Level Three, Level Four, or Level Five driving automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the system 98 performs the entire dynamic driving task (DDT) within the area that it is designed to do so. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The steering system 24 is a steer-by-wire system or electronic power steering. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle tires 17 according to selectable speed ratios. According to various embodiments, the transmission system 22 may include a step-ratio automatic transmission, a continuously-variable transmission, or other appropriate transmission. The brake system 26 is configured to provide braking torque to the vehicle tires 17. The brake system 26 may, in various embodiments, include friction brakes, brake by wire, a regenerative braking system such as an electric machine, and/or other appropriate braking systems. The steering system 24 influences the position of the vehicle tires 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more steering wheel sensors 45, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 41 (e.g., eye tracker), one or more gyroscopes, one or more accelerometers, one or more inclinometers, one or more speed sensors, one or more ultrasonic sensors, one or more inertial measurement units (IMUs), one or more night-vision devices, thermal imaging sensors, and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources). The vehicle 10 and/or system 98 does not include light sensors capable of detecting light inside the vehicle 10.

The actuator system 30 includes one or more actuator 42 that control one or more vehicle features such as, but not limited to, the propulsion system 20, the transmission system 22, the steering system 24, and the brake system 26. The steering system 24 may include a front and possibly rear steer. The rear steering control may be controlled by a separate controller. In various embodiments, the vehicle features may further include interior and/or exterior vehicle features such as, but are not limited to, doors, a trunk, and cabin features such as air, music, lighting, etc. The actuators 42 may be part of the steering system 24 and include one or more road wheel actuators (RWAs) and a hand wheel actuator (HWA).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 2) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a vehicle occupant 11 (e.g., a vehicle driver or a vehicle passenger). For example, the user interface 23 may include a touch screen and/or buttons configured to receive inputs from a vehicle occupant 11. Accordingly, the controller 34 is configured to receive inputs from the user via the user interface 23. The vehicle 10 may include one or more displays 29 configured to display information to the vehicle occupant 11 (e.g., vehicle operator or passenger) and may be a head-up display (HUD).

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 3:
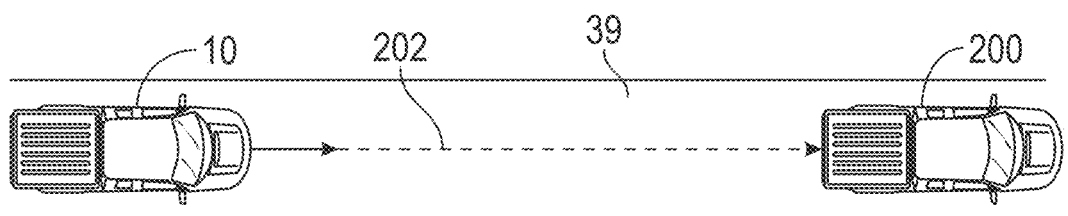
FIG. 3 is a schematic diagram of the vehicle approaching an object.

Referring to FIGS. 1 and 3, the system 98 is configured to avoid impacts with an object 200 along a path 202 thereof by taking into consideration the friction between the tires 18 and the road 39. When an impact is imminent with an object 200, an impact may be avoided by automated emergency braking or automated evasive steering. At high speeds, avoiding an impact by steering gives the driver or automated system more time margin to react, but this maneuver can cause other challenges if the road surface friction is low. The system 98 estimates surface friction when an impact is imminent and then uses that estimate to take the appropriate action to avoid an impact given the road conditions. Surface friction may be estimated by applying a short brake pulse when an impact is imminent, just before the brake-versus-steer decision needs to be made. The longitudinal response of the vehicle is used to estimate friction. If friction is low, the brake pulse is sustained and the system 98 transitions to automated emergency braking. If friction is adequate, automated evasive steering may engage, and the system 98 may use the friction estimate as a control parameter.

Figure 2:
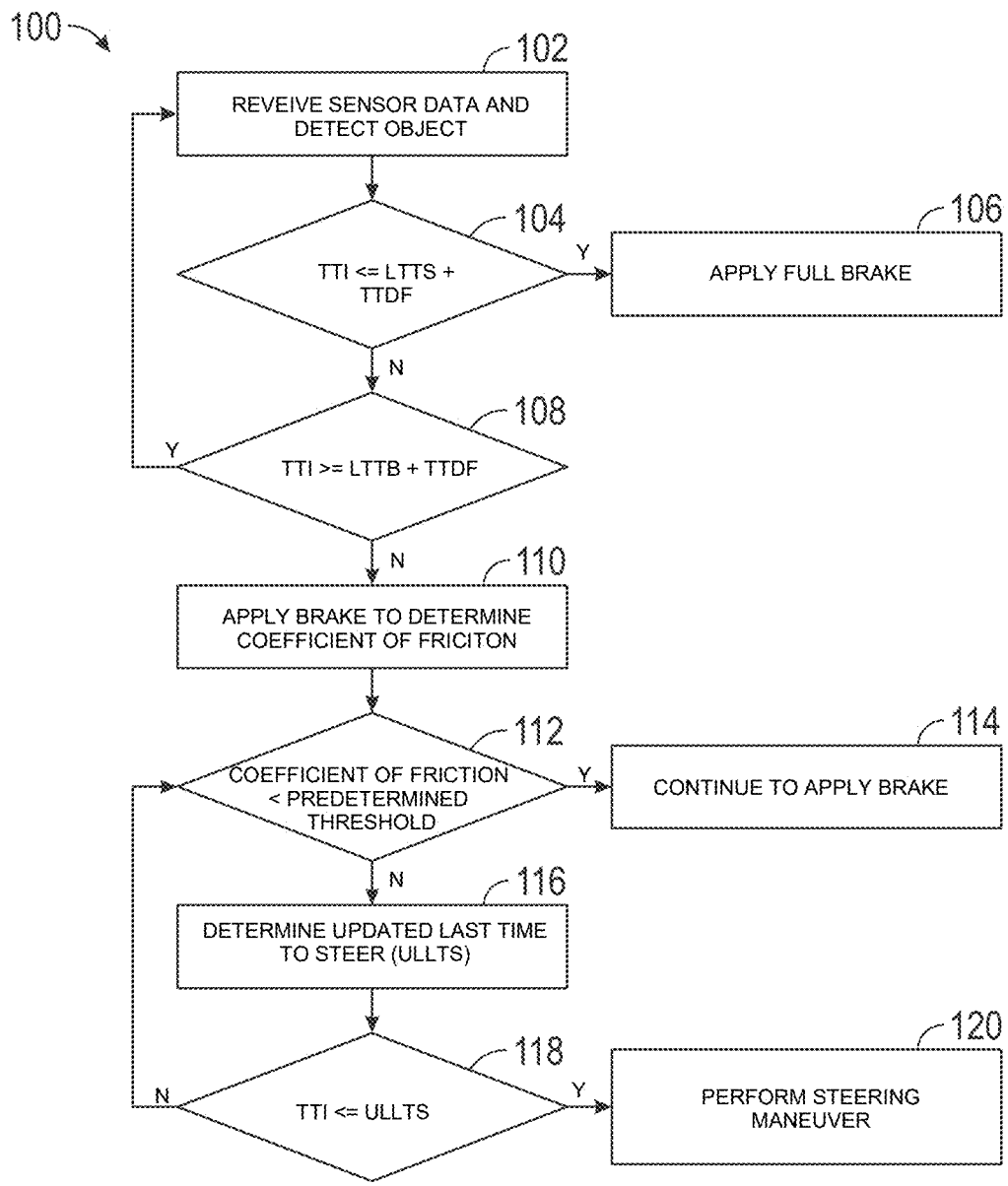
FIG. 2 is a flowchart of a method for friction-aware impact avoidance.

With reference to FIGS. 2 and 3, a method 100 is configured for friction-aware impact avoidance with another object 200 along a path 202 of the vehicle 10. As non-limiting examples, the object 200 may be another vehicle, a stationary building, a pedestrian, etc. The method 100 begins at block 102. At block 102, the controller 34 receives sensor data from the sensors 40 (e.g., camera 41). The sensor data may be indicative, among other things, of the location and movement of the objects around vehicle 10. At block 102, the vehicle controller 34 detects an object 200 that is along the path 202 of the vehicle 10 and that is within a predetermined distance from the vehicle 10 using the sensor data. Alternatively, or additionally, the vehicle 10 may use V2V or V2I communications to detect the object 200 that is along the path 202 of the vehicle 10 and that within a predetermined distance from the vehicle 10. Then, the method 100 continues to block 104.

At block 104, the vehicle controller 34 determines the time to impact (TTI) with the object 200 using, among other, vehicle speed and the distance from the vehicle 10 to the object 200. The vehicle speed of the vehicle 10 and the distance from the vehicle 10 to the object 200 may be collected by the sensors 40. The vehicle controller 34 also determines the last time to steer (LTTS). The LTTS is the shortest possible time before an impact that the vehicle 10 could steer and avoid an impact with the objectimpact200. The controller 34 may also determine the time to determine friction (TTDF), which may be a predetermined amount. The TTDF is the time it takes to determine the coefficient of friction between the road 39 and the tires 17. As a non-limiting example, the TTDF may be between 300 and 500 microseconds. Then, at block 104, the controller 34 determines the sum of the LTTS plus the TTDF. Next, the controller 34 compares the TTI with the sum of the LTTS and the TTDF. If the TTI is equal to or less than the sum of the LTTS and the TTDF, then the method 100 proceeds to block 106. At block 106, the controller 34 commands the vehicle 10 to autonomously fully brake immediately. In other words, at block 106, the controller 34 commands the brake system 26 to immediately brake the vehicle 10. If the TTI is greater than the sum of the LTTS and the TTDF, then the method 100 proceeds to block 108.

At block 108, the controller 34 determines whether the last time to brake (LTTB) to avoid the object 200 along the path of the vehicle 10. The LTTB is the shortest possible time before an impact that the vehicle 10 could brake and avoid an impact with the object 200. The LTTB may be determined using, among other things, the sensor data from the sensors 40. For example, the LTTB may be determined using the vehicle speed of the vehicle 10, the distance from the vehicle 10 to the object 200, and/or the speed of the object 200. The controller 34 then determines the sum of the LTTB plus the TTDF. Next, the controller 34 compares the TTI with the sum of the LTTB and the TTDF. If the TTI is less than the sum of the LTTB and the TTDF, then the method 100 proceeds to block 110. If the TTI is equal to or greater than the sum of the LTTB and the TTDF, then the method 100 returns to block 102. At block 110, the vehicle controller 34 commands the brake system 26 to apply a brake load to the wheels 15 to determine the coefficient of friction between the road 39 and the tires 17. Thus, the initiation of the brake pulse at block 110 depends on the estimated TTI. The brake pulse may only be initiated in a time window that is less than the LTTB plus a buffer (i.e., TTDF) and greater than the LTTS. Specifically, at block 110, the vehicle controller 34 may command the brake system 26 to apply a brake pulse (e.g., friction o regeneration) for a predetermined amount of time (e.g., 300 to 500 microsecond) to one or more wheels 15 for the purpose of road friction estimation. The brake pulse may serve as an alert to the driver that a potential impact is imminent. This braking may be accompanied by other alerts to the driver. For example, at this juncture, the controller 34 may command the user interface 23 to provide a visual and/or audible notification indicative that an impact is imminent. The display 29, for example, may issue an alert to the driver (e.g., "keep braking" and/or "do not steer"). Inadequate road friction may be used as a condition to inhibit prompts or "nudges" to suggest that the driver attempt to steer evasively (e.g., alarms, vibrations, screen messages, HUD alerts, etc.). Inadequate road friction may be used as a condition to inhibit evasive steering assist that engages after the driver begins to steer. In this case, the system 98 may continue to apply the brakes and use automated steering commands to stabilize the vehicle 10 instead of avoiding the object 200.

In one embodiment, evasive steering only engages after a driver begins to steer and assists the driver in avoiding an impact. In this embodiment, the friction estimate may be used to as a condition to inhibit prompts to suggest that the driver attempts to steer evasively. For example, if the estimated coefficient of friction is less than a predetermined coefficient threshold, then the controller 34 may command the vehicle 10 to inhibit evasive steering assist that engages after the driver begins to steer.

To determine the coefficient of friction between the road 39 and the tires 17, the controller 34 monitors a longitudinal response (e.g., the longitudinal deceleration) of the vehicle 10 using the sensor data from the sensors 40 at the same time as the braking load is applied to the wheels 15 of the vehicle 10. Using this longitudinal response (e.g., longitudinal deceleration), the controller 34 determines (i.e., estimates), in real-time, the coefficient of friction between the road 39 and the tires 17. Then, the method 100 continues to block 112. This friction estimation is used to decide the optimal impact avoidance control action (e.g., braking and/or steering). The control action may be a fully autonomous action or an assistant action by the vehicle 10. After executing block 110, the method 100 continues to block 112.

At block 112, the controller 34 compares the coefficient of friction between the road 39 and the tire 17 of the vehicle 10 with a predetermined friction threshold. If the coefficient of friction between the road 39 and the tires 17 of the vehicle 10 is less than the predetermined friction threshold, then the method 100 continues to block 114. At block 113, the controller 34 commands the braking system 26 to continue applying a braking load to the wheels 15 to avoid or mitigate an impact with the object 200. In other words, if the road friction is not sufficient for an evasive steering maneuver, the controller 34 commands the braking system 26 to continue applying a braking load to the wheels 15 to avoid or mitigate an impact with the object 200. The magnitude of the braking could be different than the one used for detecting the coefficient of friction. The term "braking load includes brake load and/or a regen torque. If the coefficient of friction between the road 39 and the tires 17 of the vehicle 10 is equal to or greater than the predetermined friction threshold, then the method 100 proceeds to block 116.

At block 116, the controller 34 determines an updated last time to steer (ULLTS) to avoid the object 200 that is along the path 202 of the vehicle 10 based on the coefficient of friction between the road 39 and the tire 17 of the vehicle 10. In other words, the controller 34 recalculates the LTTS. Then, the method 100 continues to block 118.

At block 118, the controller 34 compares the TTI with the ULLTS. If the TTI is equal to or less than the ULLTS, then the method 100 proceeds to block 120. If the TTI is greater than the ULTTS, then the method 100 returns to block 112.

At block 120, the controller 34 commands the steering system 24 to initiate an automated steering maneuver to avoid the object 200 along the path 202. A classification of the road friction (e.g., medium versus high or wet versus dry asphalt) may be used to modify the timing or shape of the evasive steering maneuver. When road friction is lower, the evasive steering maneuver may be initiated earlier to accommodate a lower curvature path. Thus, at block 120, the controller 34 may determine a steering path and the radius of curvature of the steering path. The radius of curvature of the steering path may be based on the coefficient of friction between the tire 17 and the road 39. A continuous estimate of the road friction may be used in path planning or control. For instance, the estimated friction, or the maximum lateral and longitudinal accelerations derived therefrom, may be applied as constraints in path-planning to shape the desired trajectory according to the tire limits. Further, the estimated friction coefficient may be used as a model parameter in model-predictive control or other model/parameter-based control methodology, and/or as a variable used to compute the gains for any feedback controller. Also, the maximum lateral acceleration derived from the estimated friction coefficient may be applied as a constraint in control.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method controlling a vehicle, comprising:
   detecting that an object is along a path of the vehicle and within a predetermined distance from the vehicle;
   determining a time to impact with the object that is along the path of the vehicle and within the predetermined distance from the vehicle;
   determining a time to determine friction;
   determining a last time to steer the vehicle to avoid the object along the path of the vehicle;
   determining a last time to brake to avoid the object along the path of the vehicle;
   determining a sum of the time to determine friction and the last time to steer the vehicle to avoid the object along the path of the vehicle;
   determining a sum of the last time to brake to avoid the object along the path of the vehicle and the time to determine friction;
   comparing the time to impact with the object that is along the path of the vehicle with the sum of the last time to brake to avoid the object along the path of the vehicle and the time to determine friction to determine whether the time to impact is less than the sum of the last time to brake to avoid the object along the path of the vehicle and the time to determine friction;
   in response to detecting the object that is along the path of the vehicle and within the predetermined distance from the vehicle and determining that the time to impact is less than the sum of the last time to brake to avoid the object along the path of the vehicle and the time to determine friction, determining, in real time, a coefficient of friction between a road and a tire of the vehicle, wherein determining, in real time, a coefficient of friction between a road and a tire of the vehicle comprises:
      applying a braking load to a wheel of the vehicle;
      monitoring a movement of the vehicle at the same time as the braking load is applied to the wheel of the vehicle; and
      determining, in real time, the coefficient of friction between the road and the tire of the vehicle based on the movement of the vehicle while the braking load;
   comparing the coefficient of friction between the road and the tire of the vehicle with a predetermined friction threshold to determine whether the coefficient of friction between the road and the tire of the vehicle is equal to or greater than the predetermined friction threshold;
   in response to determining that the coefficient of friction between the road and the tire of the vehicle is equal to or greater than the predetermined friction threshold, determining an updated last time to steer to avoid the object that is along the path of the vehicle based on the coefficient of friction between the road and the tire of the vehicle;
   comparing the time to impact with the object along the path of the vehicle with the updated last time to steer to avoid the object that is along the path of the vehicle to determine whether the time to impact with the object along the path of the vehicle is greater than the updated last time to steer to avoid the object that is along the path of the vehicle; and
   in response to determining the coefficient of friction between the road and the tire of the vehicle, commanding the vehicle to perform a control action, wherein the control action is steering the vehicle to avoid the object along the path of the vehicle in response to determining that the coefficient of friction between the road and the tire of the vehicle is equal to or greater than the predetermined friction threshold.

2. The method of claim 1, further comprising:
   comparing the coefficient of friction between the road and the tire of the vehicle with a predetermined friction threshold to determine whether the comparing the coefficient of friction between the road and the tire of the vehicle is less than the predetermined friction threshold; and
   wherein the control action is continuously applying the braking load to the wheel of the vehicle in response to determining that the coefficient of friction between the road and the tire of the vehicle is less than the predetermined friction threshold.

3. The method of claim 1, further comprising:
   comparing the coefficient of friction between the road and the tire of the vehicle with a predetermined friction threshold to determine whether the coefficient of friction between the road and the tire of the vehicle is equal to or greater than the predetermined friction threshold; and
   wherein the control action is steering the vehicle to avoid the object along the path of the vehicle in response to determining that the coefficient of friction between the road and the tire of the vehicle is equal to or greater than the predetermined friction threshold.

4. The method of claim 3, further comprising:
   determining a steering path to avoid the object along the path of the vehicle in response to determining that the coefficient of friction between the road and the tire of the vehicle is equal to or greater than the predetermined friction threshold, wherein the steering path has a radius of curvature; and
   wherein the determining the steering path to avoid the object along the path of the vehicle includes determining a radius of curvature of the steering path; and
   wherein the radius of curvature of the steering path is based on the coefficient of friction between the tire and the road.

5. The method of claim 1, further comprising:
   in response to determining that the time to impact with the object that is along the path of the vehicle is greater than the sum of the time to determine friction and the last time to steer the vehicle to avoid the object along the path of the vehicle, determining the last time to brake to avoid the object along the path of the vehicle;
   in response to determining that the time to impact with the object that is along the path of the vehicle is less than the sum of the time to determine friction and the last time to steer the vehicle to avoid the object along the path of the vehicle, determining a sum of the last time to brake to avoid the object along the path of the vehicle and the time to determine friction; and
   in response to determining that the time to impact with the object that is along the path of the vehicle is less than the sum of the last time to determine friction and the last time to steer the vehicle to avoid the object along the path of the vehicle, comparing the time to impact with the object that is along the path of the vehicle with the sum of the last time to brake to avoid the object along the path of the vehicle and the time to determine friction to determine whether the time to impact is less than the sum of the last time to brake to avoid the object along the path of the vehicle and the time to determine friction.

6. The method of claim 1, wherein inadequate road friction is used as a condition to inhibit evasive steering assist that engages after a vehicle driver begins to steer.

7. A system for controlling a vehicle, comprising:
a plurality of sensors;
a controller in communication with the plurality of sensors, wherein the controller is programmed to:
  detect that an object is along a path of the vehicle and within a predetermined distance from a vehicle;
  determine a time to impact with the object that is along the path of the vehicle and within the predetermined distance from the vehicle;
  determine a time to determine friction;
  determine a last time to steer the vehicle to avoid the object along the path of the vehicle;
  determine a last time to brake to avoid the object along the path of the vehicle;
  determine a sum of the time to determine friction and the last time to steer the vehicle to avoid the object along the path of the vehicle;
  determine a sum of the last time to brake to avoid the object along the path of the vehicle and the time to determine friction;
  compare the time to impact with the object that is along the path of the vehicle with the sum of the last time to brake to avoid the object along the path of the vehicle and the time to determine friction to determine whether the time to impact is less than the sum of the last time to brake to avoid the object along the path of the vehicle and the time to determine friction;
  in response to detecting the object that is along the path of the vehicle and within the predetermined distance from the vehicle and determining that the time to impact is less than the sum of the last time to brake to avoid the object along the path of the vehicle and the time to determine friction, determine, in real time, a coefficient of friction between a road and a tire of the vehicle, wherein to determine, in real time, a coefficient of friction between a road and a tire of the vehicle, the controller is programmed to:
    command a braking system to apply a braking load to a wheel of the vehicle;
    monitor a movement of the vehicle at the same time as the braking load is applied to the wheel of the vehicle; and
    determine, in real time, the coefficient of friction between the road and the tire of the vehicle based on the movement of the vehicle while the braking load;
  compare the coefficient of friction between the road and the tire of the vehicle with a predetermined friction threshold to determine whether the coefficient of friction between the road and the tire of the vehicle is equal to or greater than the predetermined friction threshold;
  in response to determining that the coefficient of friction between the road and the tire of the vehicle is equal to or greater than the predetermined friction threshold, determine an updated last time to steer to avoid the object that is along the path of the vehicle based on the coefficient of friction between the road and the tire of the vehicle;
  compare the time to impact with the object along the path of the vehicle with the updated last time to steer to avoid the object that is along the path of the vehicle to determine whether the time to impact with the object along the path of the vehicle is greater than the updated last time to steer to avoid the object that is along the path of the vehicle; and
  in response to determining the coefficient of friction between the road and the tire of the vehicle, command the vehicle to perform a control action, wherein the control action is steering the vehicle to avoid the object along the path of the vehicle in response to determining that the coefficient of friction between the road and the tire of the vehicle is equal to or greater than the predetermined friction threshold.

8. The system of claim 7, wherein the controller is programmed to:
  compare the coefficient of friction between the road and the tire of the vehicle with a predetermined friction threshold to determine whether the coefficient of friction between the road and the tire of the vehicle is less than the predetermined friction threshold; and
  wherein the control action is continuously applying the braking load to the wheel of the vehicle in response to determining that the coefficient of friction between the road and the tire of the vehicle is less than the predetermined friction threshold.

9. The system of claim 7, wherein the controller is programmed to:
  compare the coefficient of friction between the road and the tire of the vehicle with a predetermined friction threshold to determine whether the coefficient of friction between the road and the tire of the vehicle is equal to or greater than the predetermined friction threshold; and
  wherein the control action is steering the vehicle to avoid the object along the path of the vehicle in response to determining that the coefficient of friction between the road and the tire of the vehicle is equal to or greater than the predetermined friction threshold.

10. The system of claim 7, wherein the controller is programmed to:
  compare the coefficient of friction between the road and the tire of the vehicle with a predetermined friction threshold to determine whether the coefficient of friction between the road and the tire of the vehicle is or equal to or greater than the predetermined friction threshold; and
  wherein the control action is steering the vehicle to avoid the object along the path of the vehicle in response to determining that the coefficient of friction between the road and the tire of the vehicle is equal to or greater than the predetermined friction threshold.

11. The system of claim 10, wherein the controller is programmed to:
  determine a steering path to avoid the object along the path of the vehicle in response to determining that the coefficient of friction between the road and the tire of the vehicle is equal to or greater than the predetermined friction threshold, wherein the steering path has a radius of curvature; and
  determining a radius of curvature of the steering path; and
  wherein the radius of curvature of the steering path is based on the coefficient of friction between the tire and the road.

12. The system of claim 7, wherein the control action includes commanding a display of the vehicle to display an alert.

13. The system of claim 7, wherein inadequate road friction is used as a condition to inhibit prompts to suggest that a vehicle driver attempt to steer evasively.

\* \* \* \* \*